INVENTOR
Robert H. Gault

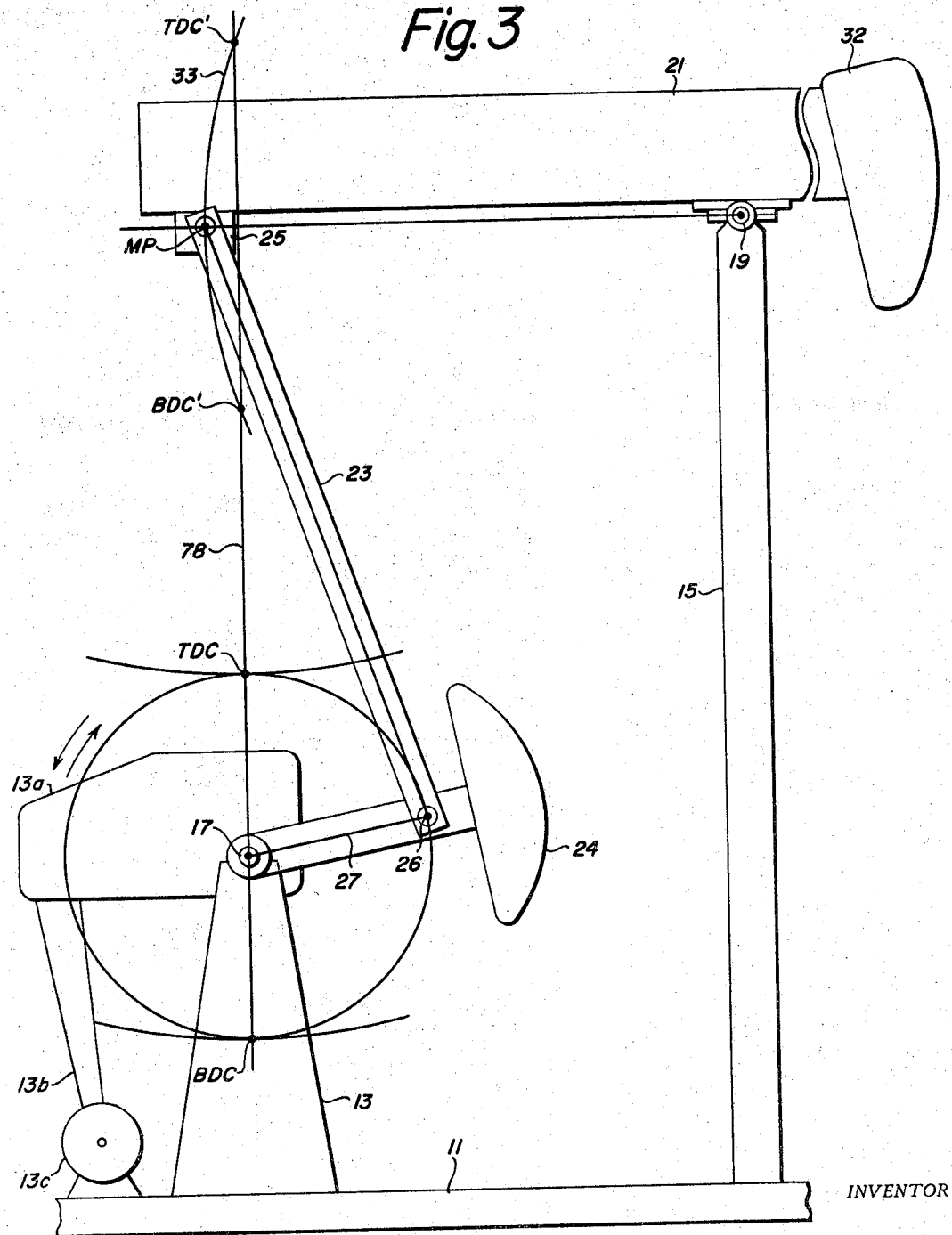

United States Patent Office 3,310,988
Patented Mar. 28, 1967

3,310,988
PUMPING UNIT DESIGN
Robert H. Gault, Midland, Tex., assignor to Bethlehem Steel Corporation, a corporation of Delaware
Filed May 13, 1964, Ser. No. 367,162
11 Claims. (Cl. 74—41)

This application is a continuation-in-part of the application of Robert H. Gault, Ser. No. 217,451, filed Aug. 16, 1962, and now abandoned.

This invention relates in general to an oil well pumping unit of the walking beam type and more particularly to the location of bearing centers and link lengths of a pumping unit having rotary counterbalance and a preferred direction of rotation.

In a pumping unit of the present invention a walking beam extends on both sides of a Samson post and is pivotally connected thereto by means of a saddle bearing. Attached to one end of the walking beam in a suitable manner are the well rods. Attached to the other end of the walking beam is the means to oscillate the walking beam about the saddle bearing and thus provide a reciprocating motion to the well rods. This means comprises a prime mover, a gear reducer including a slow speed crank shaft, a crank rotatably mounted thereon, and a pitman having one end pivotally connected to the walking beam by means of a tail bearing and the other end pivotally connected to the crank by means of a wrist pin.

During the upstroke of the well rods the load comprises the weight of the rods plus the weight of the fluid being lifted. During the downstroke, the load comprises the weight of the rods being lowered into the well hole. Present in both the upstroke and downstroke loads are acceleration forces. To compensate in part for the well load, counterbalance is added to the crank arm. Both the well load and the counterbalance act through moment arms to produce a torque. The torque which must be supplied by the gear reducer is a function of the torque from the load and the torque from the counterbalance. During the upstroke of the well rods the torque which must be supplied by the gear reducer is the torque resulting from the load minus the torque supplied by the counterbalance. During the downstroke the torque from the load is smaller than the torque from the counterbalance and the difference must be supplied by the gear reducer. The optimum condition is present when the torque supplied by gear reducer is relatively small and constant. Since torque is the product of a force times a moment arm, it is evident that the moment arms of a pumping unit are critical. These moment arms are a function of the link lengths and the location of the bearing centers, i.e. the geometry of the pumping unit. This invention provides a pumping unit having a rotary counterbalance wherein the link lengths and bearing centers are so selected as to have an advantageous moment arm relationship.

Furthermore, the geometry of the pumping unit of this invention is such as to eliminate an enforced negative torque on the slow speed shaft of the gear reducer. An enforced negative torque generally occurs in pumping units when the rotary counterbalance is directly above or below the crank shaft or when the crank passes through bottom or top dead center and either the counterbalance or well load exerts a torque in the same direction as the gear reducer torque. When this occurs, the torque from the load or counterbalance attempts to drive the gear reducer. As a result, there is an undesirable reversal of stress in the gear reducer and other parts of the pumping unit. This is commonly known as "backlash."

The geometry of the pumping unit also provides a greater crank travel and time during the upstroke of the well rods. This longer crank travel imparts a more uniform motion to the well rods and a decrease in acceleration and deceleration loads.

In addition the geometry of the pumping unit allows a longer stroke with a reduced crank radius or wrist pin circle. This smaller wrist pin circle is instrumental in providing desirable crank moment arms.

An object of this invention is to provide a pumping unit which has a preferred direction of rotation and which is free of enforced negative torque.

Another object of this invention is to provide a pumping unit which by the location of bearing centers and the selection of link lengths results in a more efficient unit.

Still another object of this invention is to provide a pumping unit which makes more efficient use of a rotary counterbalance.

A further object of this invention is to provide a pumping unit which has a greater crank travel during the lifting of the well load.

FIG. 3 is a view similar to FIG. 1 showing another embodiment of this invention.

Figure 1:
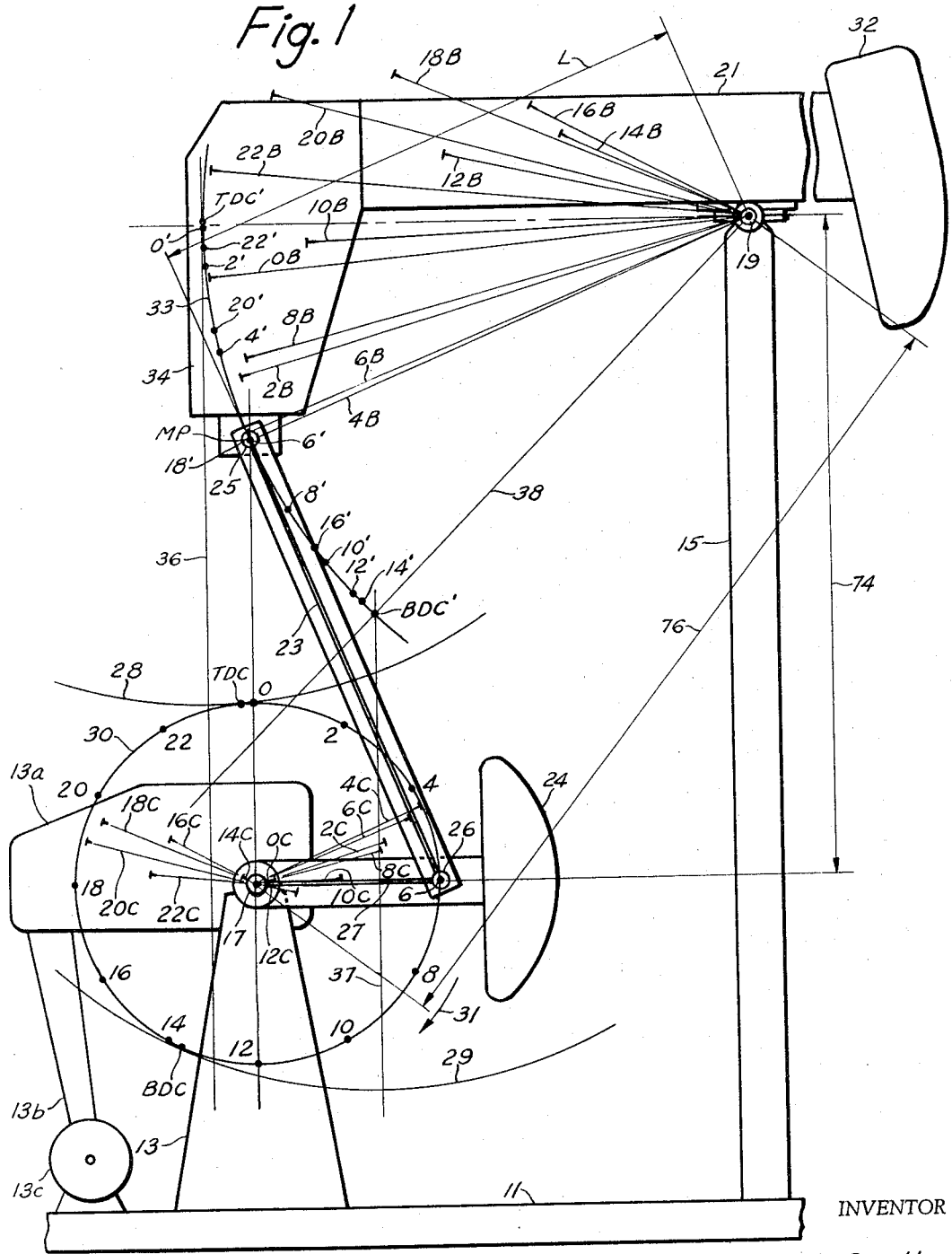
FIG. 1 is a side elevational view of a pumping unit of this invention with a diagrammatic view superimposed thereon and in which the preferred direction of rotation of the crank is clockwise.

In the drawings, 11 indicates the base of a pumping unit which supports gear reducer support 13 and Samson post 15. Mounted on gear reducer support 13 is a gear reducer 13a suitably connected by drive belt 13b to a prime mover 13c and having a slow speed or crank shaft 17. Pivotally mounted on Samson post 15 by means of a saddle bearing 19 is a walking beam 21. As shown, walking beam 21 extends on both sides of Samson post 15. Suitably attached to one end of the walking beam is a horsehead 32 to which is attached in the customary manner the polish rod and well rods (not shown). A pitman 23 is pivotally connected adjacent the other end of the walking beam 21 by means of tail bearing 25. Pitman 23 is also pivotally connected to crank 27 by means of wrist pin 26. Crank 27 has a counterbalance 24 adjustably mounted thereon. Crank shaft 17 supplies rotary motion to crank 27 and this rotary motion is translated into an oscillating or rocking motion of the walking beam 21 about saddle bearing 19. The above elements are provided with the proper bearing surfaces and connected together in the customary manner well known in the art.

With reference to FIG. 1, the tail bearing 25 will describe an arc or segment of a circle 33 for the given length of walking beam and pump stroke. This invention places the top point of the arc 33 or the top dead center TDC' substantially on a horizontal plane through the saddle bearing 19. By so locating the tail bearing arc 33, the vertical displacement for a given length of arc is relatively small. The small vertical displacement results in a small wrist pin circle 30 for a given pump stroke. Having ascertained the limits of the tail bearing arc 33, the crank shaft 17 is then located in the area created by vertical lines 36, 37 through the top dead center TDC' of the arc 33 and the lower end point or bottom dead center BDC' of the arc 33, respectively, and below a line 38 extending from the saddle bearing 19 through the lower end point BDC' of the arc 33. By placing the crank shaft 17 in this area and providing a clockwise rotation, the geometry of the unit provides a crank travel in excess of 180° during the upstroke of the well load. Also, the unit is free of an enforced negative torque. Having defined the general location of the crank shaft 17, the specific location is established by selecting a pitman 23 length and describing an arc 28 with a pitman 23 length as a radius and the TDC' as the center and a second arc 29 with the pitman 23 length as a radius and the BDC' as the center. The wrist pin circle is then selected such that the center of the crank shaft 17 is within the above defined area and the wrist pin circle 30 is tangent to the arcs 28, 29. The pitman 23 length selected may be as short as possible considering the necessary clearances.

For the unit shown in FIG. 1, the crank shaft 17 is located on the vertical line through the midpoint MP of the arc 33. If a value of L is assigned to the distance between the saddle bearing 19 and tail bearing 25, the pitman 23 length is approximately .9L, the diameter of the wrist pin circle is approximately .66L, the vertical distance 74 between the crank shaft 17 and the saddle bearing 19 is approximately 1.20L, and the diagonal distance 76 between the crank shaft 17 and saddle bearing 19 is approximately 1.51L.

As shown in FIG. 1, the tail bearing 25 is located a distance about equal to one-half the vertical displacement of arc 33 below the saddle bearing 19 when the walking beam 21 is in a substantially horizontal position and the crank 27 is at position 6 on the wrist pin circle 30. Plate 34 extends below the walking beam 21 and supports tail bearing 25. This arrangement allows the walking beam 21 to oscillate a substantially equal number of degrees above and below the horizontal.

In order to illustrate the moment arms (crank and rear beam) obtained from the pumping unit geometry as disclosed in FIG. 1, the wrist pin circle 30 is divided into equal segments by points 2, 4, 6, 8, etc. and the corresponding tail bearing 25 positions on the arc are indicated by 2', 4', 6', 8', etc. The TDC and BDC are also indicated on the wrist pin circle 30 and tail bearing arc 33. The direction of rotation of the crank 27 is indicated by arrow 31. This direction will be referred to as a clockwise rotation of the crank 27. In other words when the pumping unit is viewed as shown in FIG. 1 (horsehead on the right and gear reducer on the left of the viewer), a direction of rotation as indicated by arrow 31 is clockwise. Of course, a direction of rotation opposite to that indicated by arrow 31 is counterclockwise. The rear beam moment arm RBMA is the effective length of the walking beam 21 through which a force applied along the pitman 23 acts about saddle bearing 19. In FIG. 1 the rear beam moment arm for various positions 2, 4, 6, etc. of the crank is indicated by lines 2B, 4B, 6B, etc. and is the length of a line which extends from the saddle bearing 19 to a line through the pitman 23 and perpendicular thereto. The crank moment arm CMA is the effective length of the crank through which a force applied along the pitman 23 acts about crank shaft 17. The crank moment arm is indicated by line 2C, 4C, 6C, etc. and is a line extending from the crank shaft 17 center to a line through the pitman 23 and perpendicular thereto. The front beam moment arm FBMA due to the shape of the horsehead is a constant and equal to the distance from the saddle bearing 19 to the working surface of the horsehead 32.

The torque factor is the torque which must be supplied at the wrist pin to offset a unit load at the well end of the walking beam 21 and is dependent on the geometry of the unit. The torque factor is arrived at by the summation of moments about the saddle bearing 19 and crank shaft 17 when a unit well load is present. The torque factor is calculated by the following formula:

$$TF = \frac{FBMA \times CMA}{RBMA}$$

The following Table 1 lists the crank moment arm (CMA), rear beam moment arm (RBMA), and torque factor (TF) for the pumping unit of FIG. 1 in which the distance from saddle bearing to tail bearing is 96 inches, the pumping unit stroke is 74 inches, the wrist pin circle diameter is 63 inches, and the front beam moment arm is 96 inches:

TABLE 1

| Crank Position | CMA | RBMA | TF |
| --- | --- | --- | --- |
| 0 | 2.6 | 95.8 | 2.61 |
| 2 | 22.6 | 94.0 | 23.08 |
| 4 | 31.2 | 94.9 | 31.56 |
| 6 | 29.4 | 96.0 | 29.40 |
| 8 | 22.6 | 92.0 | 23.58 |
| 10 | 14.6 | 77.8 | 18.02 |
| 12 | 6.8 | 54.6 | 10.20 |
| 14 | 2.8 | 34.8 | −7.72 |
| 16 | 17.0 | 42.4 | −38.49 |
| 18 | 29.1 | 66.6 | −42.95 |
| 20 | 30.6 | 86.0 | −34.16 |
| 22 | 18.4 | 94.9 | −18.61 |

For crank positions 14 through 22 it will be noted that the torque factor is preceded by a minus sign. This sign merely indicates that the direction of force due to the well load is opposite that of positions 0 through 12.

With reference to Table 1, during most of the upstroke of the well rods including positions 0 through 12 the RBMA remains long and due to the small wrist pin circle relative to the length of stroke the CMA is relatively short. The RBMA during the greater part of the upstroke is about equal to the distance between the tail bearing 25 and saddle bearing 19 or 96 inches. This combination of long RBMA and short CMA during the upstroke of the well rods produces a small torque factor. For example at crank position 8 where the CMA is 22.6 inches, the RBMA is 92.0 inches and the TF is 23.58 inch-lbs., this indicates that for every one lb. of load 23.58 in.-lbs. of torque must be supplied at the wrist pin. This small upstroke TF indicates that a large well load can be lifted with less torque at the wrist pin.

With reference to Table 1, during most of the downstroke of the well load including positions 14 through 22 the RBMA is relatively short. This results in a large torque factor for most of the downstroke crank positions. This large torque factor allows a large amount of counterbalance to be lifted by the available small well load. As stated above, the torque supplied by the gear reducer is dependent upon the torque from the well load and the torque from the counterbalance. Since a large amount of counterbalance can be lifted by the well load on the downstroke this large amount of counterbalance will aid the gear reducer in lifting the upstroke load. The result is a smaller torque requirement for the gear reducer.

As indicated in FIG. 1 the upstroke motion of the crank occurs through about 205° of the crank travel. This produces a more uniform motion of the well rods and a reduction in acceleration and deceleration loads.

A further factor to be considered in the design of a pumping unit is the phase relationship between the torque exerted by the counterbalance and that exerted by the well load. The above torque factors are an indication of the phase and magnitude of the torque from the well load.

The rotary counterbalance exerts a torque which varies as the horizontal distance between the crank shaft 17 center and a vertical line through the center of gravity of the counterbalance weight 24. Thus maximum torque is available from the counterbalance 24 at the 90° and 270° (6 and 18) positions of the crank, while zero torque is present at the 180° and 360° positions (12 and 0). In the ideal pumping unit the torque supplied by the gear reducer would be constant. In order to arrive at this ideal condition with a rotary counterbalance the torque exerted by the well load would approach the torque value of the counterbalance 24 but have a value slightly greater on the upstroke and slightly smaller on the downstroke. An indication of the phase and magnitude relationship between the well load and counterbalance is shown in the following Table 2 wherein a gear reducer torque of 160,000 inch-pounds and a counterbalance torque of 400,000 inch-pounds at 90° is supplied.

TABLE 2

| Crank Position | TF | Counterbalance Torque ×1,000 inch-pounds | Reducer Torque ×1,000 inch-pounds | Net Torque ×1,000 inch-pounds | Permissible loads, pounds |
|---|---|---|---|---|---|
| 0 | 2.61 | 0 | 160 | 160.0 | 61,303 Max. |
| 2 | 23.08 | 200.0 | 160 | 360.0 | 15,598 Max. |
| 4 | 31.56 | 346.4 | 160 | 506.4 | 16,033 Max. |
| 6 | 29.40 | 400.0 | 160 | 560.0 | 19,050 Max. |
| 8 | 23.58 | 346.4 | 160 | 506.4 | 20,681 Max. |
| 10 | 18.02 | 200.0 | 160 | 360.0 | 19,977 Max. |
| 12 | 10.20 | 0 | 160 | 160.0 | 15,686 Max. |
| 14 | −7.72 | −200.0 | 160 | −40.0 | 5,191 Min. |
| 16 | −38.49 | −346.4 | 160 | −186.4 | 4,832 Min. |
| 18 | −42.95 | −400.0 | 160 | −240.0 | 5,587 Min. |
| 20 | −34.16 | −346.4 | 160 | −186.4 | 5,457 Min. |
| 22 | −18.61 | −200.0 | 160 | −40.0 | 2,149 Min. |

A minus sign indicates that the direction of the torque is opposite that of crank positions 0 through 12.

As shown in Table 2 the upstroke torque factors including crank positions 0 through 12 are relatively small, this allows less counterbalance weight to lift the well load for a given gear reducer torque or alternately allows a given gear reducer torque to lift the well load with less counterbalance. On the downstroke including crank positions 14 through 22, the well load is aiding the gear reducer in lifting the counterbalance. The relatively large torque factors allow the well load to lift a large amount of counterbalance thus necessitating a relatively small torque from the gear reducer. Furthermore the magnitude of the TF varies substantially the same as the counterbalance torque. The net torque of Table 2 is the algebraic sum of the reducer torque and counterbalance torque. The permissible load is obtained by dividing the net torque by the torque factor. On the upstroke or positions 0 through 12 the permissible load is indicated as a maximum. This indicates the maximum well load that can be lifted by the gear reducer and counterbalance. On the downstroke or positions 14 through 22 the permissible load is indicated as a minimum. This indicates the minimum well load which must be present to aid the gear reducer in lifting the counterbalance weight. It can be noted that the permissible loads during substantially the entire upstroke and downstroke are relatively constant. This is accomplished by the particular geometry of the unit and in turn the desirable phase and magnitude relationship between the torque factors and the rotary counterbalance.

Rotary counterbalance is used to accomplish the above advantages. However, it is possible to supplement the disclosed rotary counterbalance with beam counterbalance.

Figure 2:
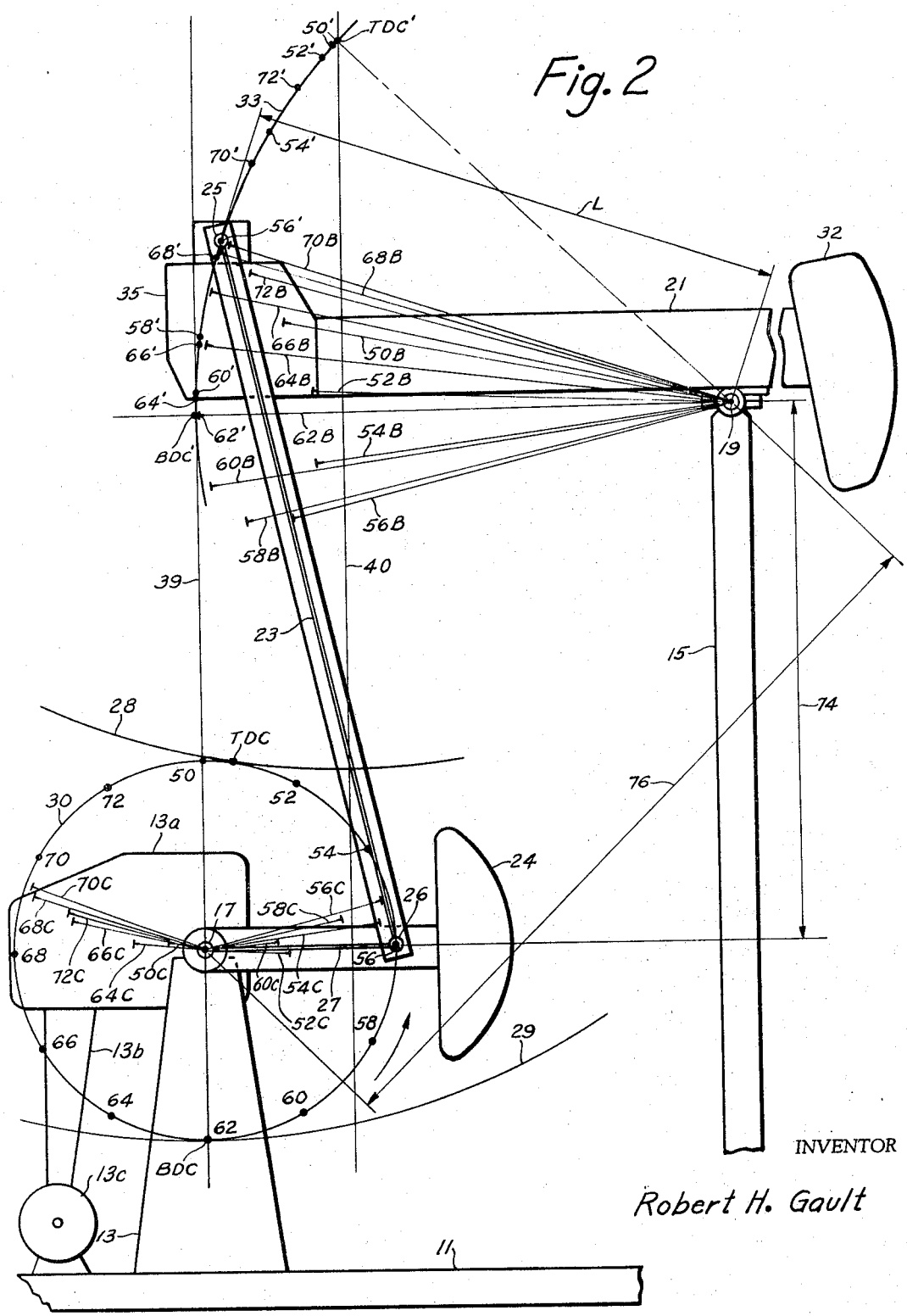
FIG. 2 is a view similar to FIG. 1, however the preferred direction of rotation of the crank is counterclockwise.

While FIG. 1 has disclosed a specific location for the crank shaft 17 in addition to specific dimensions for the various links it has been determined that a pumping unit having the desired torque factors absence of enforced negative torque and permissible load capacity is provided if the following range of dimensions in terms of L, the distance from the saddle bearing 19 to the tail bearing 25, is maintained:

Pitman length _____ .97L to 1.01L
Dia of wrist pin circle _____ .75L to .76L
Vertical distance between the crank shaft and the saddle bearing _____ 1.17L to 1.21L
Diagonal distance between the crank shaft and the saddle bearing _____ 1.51L to 1.56L FIG. 2 shows an arrangement wherein the crank is rotated in a counterclockwise direction as indicated by the arrow. In the counterclockwise unit of FIG. 2 the lower end point of the tail bearing arc 33 does not extend substantially below a horizontal plane through the saddle bearing 19. The crank shaft 17 of FIG. 2 is located in the area bounded by vertical lines 39, 40 through the end points of tail bearing arc and below a line passing through the saddle bearing 19 and the tail bearing 25. It is preferable to provide a pitman 23 length as short as possible consistent with necessary clearances. This location for the crank shaft 17 and tail bearing arc 33 provides all the advantages possessed by the unit of FIG. 1, including a small wrist pin circle 30, crank travel in excess of 180° during the upstroke of the well rods, a unit free of enforced negative torque, and desirable moment arms.

In FIG. 2 the tail bearing 25 is located a distance about equal to one-half the vertical displacement of arc 33 above the saddle bearing when the walking beam 21 is in a substantially horizontal position. Plate 35 extends above the walking beam 21 and supports tail bearing 25. As in FIG. 1 this arrangement allows the walking beam 21 to oscillate a substantially equal number of degrees above and below the horizontal.

With reference to FIG. 2 the wrist pin circle is divided into equal segments 50, 52, 54, etc. to 72 and the corresponding positions on the tail bearing arc are indicated by 50′, 52′, 54′, etc. to 72′. The rear beam moment arms are indicated by 50B, 52B, etc. and the crank moment arms are indicated as 50C, 52C, etc. These moment arms are determined in the same manner as indicated above for FIG. 1. It can be seen that the beam moment arms on the upstroke are appreciably longer than the beam moment arms on the downstroke and the same advantages referred to for the pumping unit of FIG. 1 are obtained. These advantages include the phase and magnitude relationship between the counterbalance torque and well load torque referred to in Tables 1 and 2 for FIG. 1.

For the unit shown in FIG. 2, the crank shaft 17 is located on the vertical line 39 through the lower point of arc 33. If a value of L is assigned to the distance between the saddle bearing 19 and tail bearing 25, the pitman 23 length is approximately 1.35L, the diameter of the wrist pin circle is approximately .71L, the vertical distance 74 between the crank shaft 17 and saddle bearing is approximately 1.00L, and the diagonal distance 76 between the crank shaft 17 and saddle bearing 19 is approximately 1.41L.

The clockwise unit of FIG. 1 and the counterclockwise unit of FIG. 2 places one end point of the tail bearing arc 33 substantially on a horizontal line through the saddle bearing 19. This arrangement provides the advantages enumerated above. However, a clockwise or counterclockwise pumping unit having counterbalance as shown in FIGS. 1 and 2 may be provided wherein the tail bearing arc 33 extends some distance above and below this horizontal line. Such a unit will possess to a lesser degree the advantages cited above and in addition will be free of enforced negative torque if the crank shaft 17 is located in the area created by vertical lines through the end points (TDC′ and BDC′) of the arc 33 as stated above. In an arrangement where the midpoint of the arc 33 is located below the horizontal line through the saddle bearing 19 the unit must be rotated clockwise to be free of enforced negative torque. Where the midpoint of the arc 33 is located above this horizontal line the unit must be rotated counterclockwise. Where the midpoint of the arc 33 is located on this horizontal line the unit may be rotated in either direction, as shown in FIG. 3. In this latter case one vertical line 78 would pass through the end points, TDC′ and BDC′ of the tail bearing arc 33 and the crank shaft 17 would be located on this line.

With reference to the clockwise and counterclockwise units, FIGS. 1 and 2, enforced negative torque is eliminated by so locating the crank shaft 17 with respect to the arc 33 such that the top dead center TDC of the pitman occurs before or is coincident with the geometric top O of the crank circle or the point of zero counterbalance torque and the bottom dead center BDC occurs after or is coincident with the geometric bottom 12 of the crank circle or the point of zero counterbalance torque. These conditions are present in a clockwise unit when the crank shaft is located in the area created by vertical lines through the end points of the arc and the midpoint of the tail bearing arc is located below a horizontal line through the saddle bearing and in a counterclockwise unit when the crank shaft is in this same area and the midpoint of the tail bearing arc is located above this horizontal line.

In the usual operation of the above pumping units of FIGS. 1 and 2 the indicated direction of rotation is mandatory. While it is possible to rotate the unit in the opposite direction from that indicated, detrimental overloading of the gear reducer and structural components will occur.

Although I have described my invention hereinabove in considerable detail, I do not wish to be limited narrowly to the exact and specific particulars disclosed, but I may also use such substitutes, modifications, or equivalents as are included within the scope and spirit of the invention or pointed out in the appended claims.

I claim:
1. In a pumping unit embodying
   a walking beam pivotally connected to a Samson post by means of a saddle bearing,
   a crank rotatably mounted on a crank shaft and having a counterbalance attached thereto, and
   a rigid pitman having one end pivotally connected to said walking beam by means of a tail bearing and the other end pivotally connected to said crank by means of a wrist pin,
   the improvement comprising
   (a) said crank shaft located within the area defined by vertical lines through the end points of the segment of a circle subtended by said tail bearing during oscillation of said walking beam, the same segment of a circle being followed by said tail bearing during upward and downward movement of said tail bearing,
   (b) means for driving said crank shaft,
   (c) said means arranged to drive the crank shaft in a clockwise direction when the midpoint of said segment of a circle is located below a horizontal line through said saddle bearing and in a counter-clockwise direction when the midpoint of said segment of a circle is located above said horizontal line.

2. In a pumping unit embodying
   a walking beam pivotally connected to a Samson post by means of a saddle bearing,
   a crank rotatably mounted on a crank shaft and having a counterbalance attached thereto, and
   a rigid pitman having one end pivotally connected to said walking beam by means of a tail bearing and the other end pivotally connected to said crank by means of a wrist pin,
   the improvement comprising
   (a) said crank shaft located within the area defined by vertical lines through the end points of the segment of a circle substeded by said tail bearing during oscillation of said walking beam, the same segment of a circle being followed by said tail bearing during upward and downward movement of said tail bearing,
   (b) the midpoint of said segment of a circle located on a horizontal line through said saddle bearing, and
   (c) means to drive said crank shaft.

3. In a pumping unit embodying
   a walking beam pivotally connected to a Samson post by means of a saddle bearing,
   a crank rotatably mounted on a crank shaft and having a counterbalance attached thereto, and
   a rigid pitman having one end pivotally connected to said walking beam by means of a tail bearing and the other end pivotally connected to said crank by means of a wrist pin,
   the improvement comprising
   (a) said crank shaft located within the area defined by vertical lines through the end points of the segment of a circle subtended by said tail bearing during oscillation of said walking beam, the same segment of a circle being followed by said tail bearing during upward and downward movement of said tail bearing,
   (b) the midpoint of said segment of a circle located below a horizontal line through said saddle bearing, and
   (c) means to drive said crank shaft in a clockwise direction.

4. The apparatus disclosed in claim 3 wherein the distance between said tail bearing and said saddle bearing is equal to L, the length of said pitman is within the range of .97L to 1.01L, the diameter of the wrist pin circle is within the range of .7L to .76L, the vertical distance between said crank shaft and said saddle bearing is within the range of 1.17L to 1.21L, and the distance between said crank shaft and said saddle bearing is within the range of 1.51L to 1.56L.

5. In a pumping unit embodying
   a walking beam pivotally connected to a Samson post by means of a saddle bearing,
   a crank rotably mounted on a crank shaft and having a counterbalncae attached thereto, and
   a rigid pitman having one end pivotally connected to said walking beam by means of a tail bearing and the other end pivotally connected to said crank by means of a wrist pin,
   the improvement comprising
   (a) said crank shaft located within the area defined by vertical lines through the end points of the segment of a circle subtended by said tail bearing during oscillation of said walking beam, the same segment of a circle being followed by said tail bearing during upward and downward movement of said tail bearing.
   (b) the upper end point of said segment of a circle located substantially on a horizontal line through said saddle bearing, and
   (c) means to drive said crank shaft in a clockwise direction.

6. In a pumping unit embodying
   a walking beam pivotally connected to a Samson post by means of a saddle bearing,
   a crank rotatably mounted on a crank shaft and having a counterbalance attached thereto, and
   a rigid pitman having one end pivotally connected to said walking beam by means of a tail bearing and the other end pivotally connected to said crank by means of a wrist pin,
   the improvement comprising
   (a) said crank shaft located on a vertical line passing through the midpoint of the segment of a circle subtended by said tail bearing during oscillation of said walking beam, the same segment of a circle being followed by said tail bearing during upward and downward movement of said tail bearing.
   (b) the upper end point of said segment of a circle located substantially on a horizontal line through said saddle bearing, and
   (c) means to drive said crank shaft in a clockwise direction.

7. The apparatus disclosed in claim 6 wherein the distance between said tail bearing and said saddle bearing is equal to L, the length of said pitman is approximately .9L, the diameter of the wrist pin circle is approximately .66L, the vertical distance between said crank shaft and said saddle bearing is approximately 1.20L, and the distance between said crank shaft and said saddle bearing is approximately 1.51L.

8. In a pumping unit embodying
a walking beam pivotally connected to a Samson post by means of a saddle bearing,
a crank rotatably mounted on a crank shaft and having a counterbalance attached thereto, and
a rigid pitman having one end pivotally connected to said walking beam by means of a tail bearing and the other end pivotally connected to said crank by means of a wrist pin,
the improvement comprising
(a) said crank shaft located within the area defined by vertical lines through the end points of the segment of a circle subtended by said tail bearing during oscillation of said walking beam, the same segment of a circle being followed by said tail bearing during upward and downward movement of said tail bearing,
(b) the midpoint of said segment of a circle located above a horizontal line through said saddle bearing, and
(c) means to drive said crank shaft in a counterclockwise direction.

9. In a pumping unit embodying
a walking beam pivotally connected to a Samson post by means of a saddle bearing,
a crank rotatably mounted on a crank shaft and having a counterbalance attached thereto, and
a rigid pitman having one end pivotally connected to said walking beam by means of a tail bearing and the other end pivotally connected to said crank by means of a wrist pin,
the improvement comprising
(a) said crank shaft located within the area defined by vertical lines through the end points of the segment of a circle subtended by said tail bearing during oscillation of said walking beam, the same segment of a circle being followed by said tail bearing during upward and downward movement of said tail bearing,
(b) the lower end point of said segment of a circle located substantially on a horizontal line through said saddle bearing, and
(c) means to drive said crank shaft in a counterclockwise direction.

10. In a pumping unit embodying
a walking beam pivotally connected to a Samson post by means of a saddle bearing,
a crank rotatably mounted on a crank shaft and having a counterbalance attached thereto, and
a rigid pitman having one end pivotally connected to said walking beam by means of a tail bearing and the other end pivotally connected to said crank by means of a wrist pin,
the improvement comprising
(a) said crank shaft located on a vertical line through the lower end point of the segment of a circle subtended by said tail bearing during oscillation of said walking beam, the same segment of a circle being followed by said tail bearing during upward and downward movement of said tail bearing,
(b) said lower end point of said segment of a circle located substantially on a horizontal line through said saddle bearing, and
(c) means to drive said crank shaft in a counterclockwise direction.

11. The apparatus disclosed in claim 10 wherein the distance between said tail bearing and said saddle bearing is equal to L, the length of said pitman is approximately 1.35L, the diameter of wrist pin circle is approximately .71L, the vertical distance between said crankshaft and said saddle bearing is approximately 1.0L, and the distance between said crank shaft and said saddle bearing is approximately 1.41L.

References Cited by the Examiner
UNITED STATES PATENTS

| | | | |
|---|---|---|---|
| 1,240,715 | 9/1917 | Heeter | 74—103 X |
| 1,890,807 | 12/1932 | Faber | 74—41 |
| 2,294,094 | 8/1942 | O'Leary | 74—591 |
| 2,958,237 | 11/1960 | Johnson | 74—41 X |
| 3,006,201 | 10/1961 | Ross | 74—41 |
| 3,144,778 | 8/1964 | Lott | 74—41 |

FRED C. MATTERN, JR., *Primary Examiner.*

MILTON KAUFMAN, *Examiner.*

F. E. BAKER, *Assistant Examiner.*